United States Patent [19]

Umemura

[11] Patent Number: 5,014,198
[45] Date of Patent: May 7, 1991

[54] IMAGE INFORMATION COMPRESSION APPARATUS

[75] Inventor: Yoshiyuki Umemura, Tochigi, Japan

[73] Assignee: Kabushiki Kaisha Toshiba, Kawasaki, Japan

[21] Appl. No.: 503,126

[22] Filed: Apr. 3, 1990

Related U.S. Application Data

[63] Continuation of Ser. No. 140,679, Jan. 4, 1988, abandoned.

[30] Foreign Application Priority Data

Jan. 13, 1987 [JP] Japan .................................. 62-3969

[51] Int. Cl.⁵ ........................ G06F 15/42; G06F 15/62
[52] U.S. Cl. ................................. 364/413.13; 382/56

[56] References Cited

U.S. PATENT DOCUMENTS

| | | | |
|---|---|---|---|
| 4,020,462 | 4/1977 | Morrin | 382/56 |
| 4,533,947 | 8/1985 | Smith | 364/413.14 X |
| 4,551,023 | 11/1985 | Nakauchi | 356/444 |
| 4,555,802 | 11/1985 | Fedak et al. | 382/56 |
| 4,668,995 | 5/1987 | Chen et al. | 382/52 X |
| 4,751,572 | 6/1988 | Baumbaugh et al. | 358/133 |
| 4,797,742 | 1/1989 | Sugiyama et al. | 358/141 |
| 4,797,944 | 1/1989 | Tanaka | 382/56 |
| 4,805,030 | 2/1989 | Tanaka | 358/260 X |

FOREIGN PATENT DOCUMENTS

| | | | |
|---|---|---|---|
| 0173526 | 8/1986 | Japan | 382/50 |
| 2129660A | 5/1984 | United Kingdom . | |

OTHER PUBLICATIONS

Singer, "Advanced Bandwidth Compression Schemes" *SPIE vol. 178 Smart Sensors* 1979 pp. 162–166.
*Pat. Abstracts of Jap.*, Matsunawa et al., Abs. No. 57-206170, vol. 7, No. 58 (E 163).
*Pat. Abstracts of Jap.*, Ishizawa Abs. No. 61-161073, vol. 10, No. 363 (E461).
*Pat. Abstracts of Jap.*, Ishii Abs. No. 61-202574, vol. 11, No. 33 (E476).
*Pat. Abstracts of Jap.* Sato Abs. No. 61-245281 vol. 11, No. 93 (P559).
Rosenfeld et al., *Digital Picture Processing*, Second Edition, vol. 1, published by Academic Press (New York), 1982, pp. 160–165.
Paul M. Farrelle and Anil K. Jain, Recursive Block Coding—A New Approach to Transform Coding, IEEE Transactions on Communications, vol. COM-34, No. 2, Feb. 1986.

Primary Examiner—Jerry Smith
Assistant Examiner—David Huntley
Attorney, Agent, or Firm—Finnegan, Henderson, Farabow, Garrett, and Dunner

[57] ABSTRACT

An image compression apparatus for compressing medical information such as X-ray image data divides the image data into blocks and extracts the region of interest from the image data, excluding the background portion. The image data blocks containing the region of interest are orthogonally transformed by discrete cosine transformation for forming a bit allocation table. The bit assignments in the bit allocation table for the orthogonally-transformed coefficients are adapted only for the image data containing the region of interest. The original image data blocks are orthogonally transformed and quantized according to the bit allocation table to obtain the compressed image data.

11 Claims, 3 Drawing Sheets

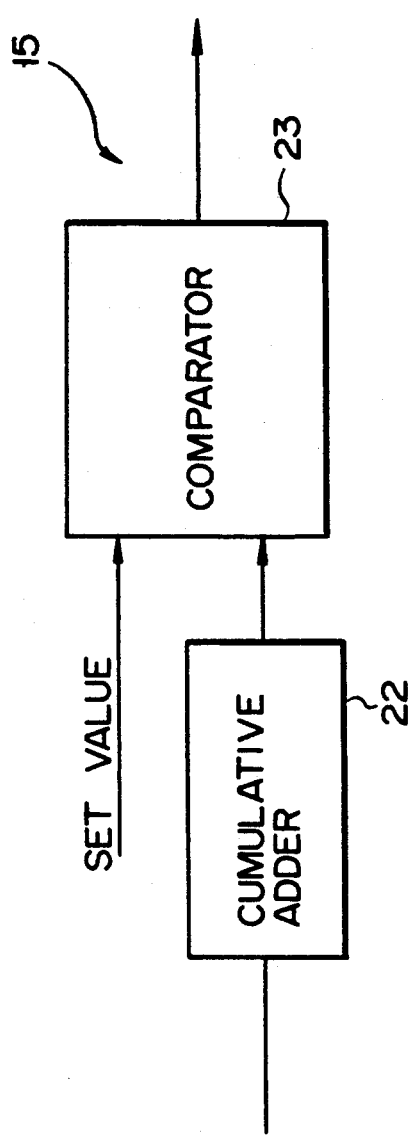
F I G. 2
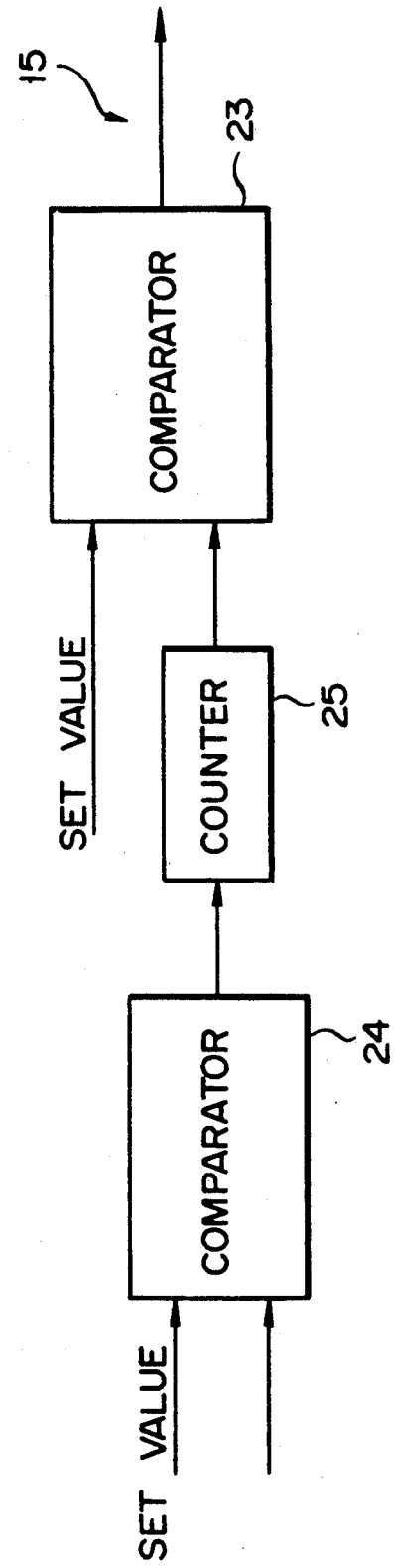
F I G. 3

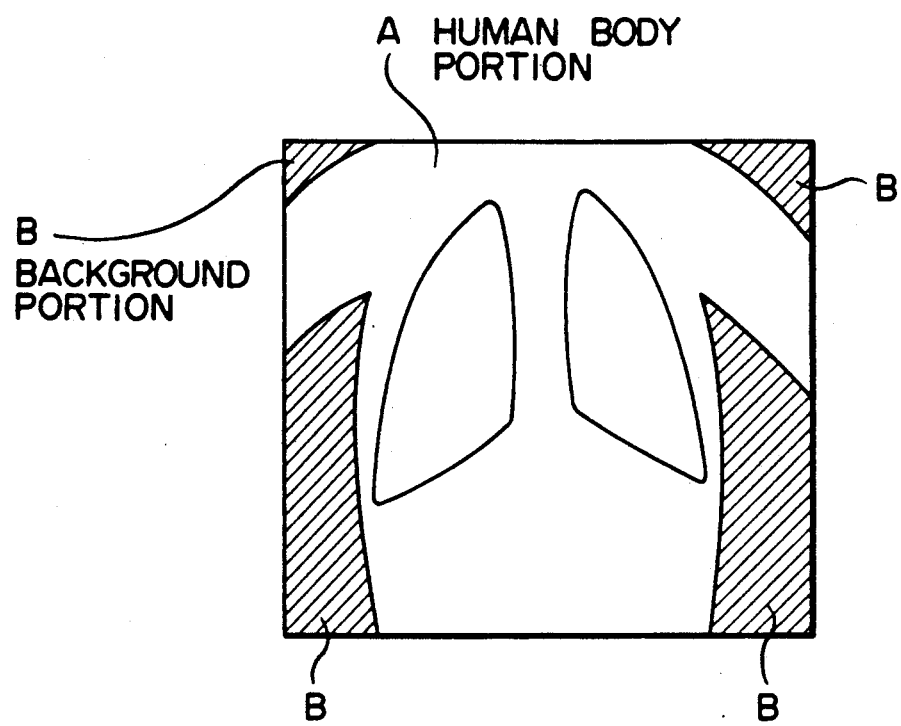
F I G. 4
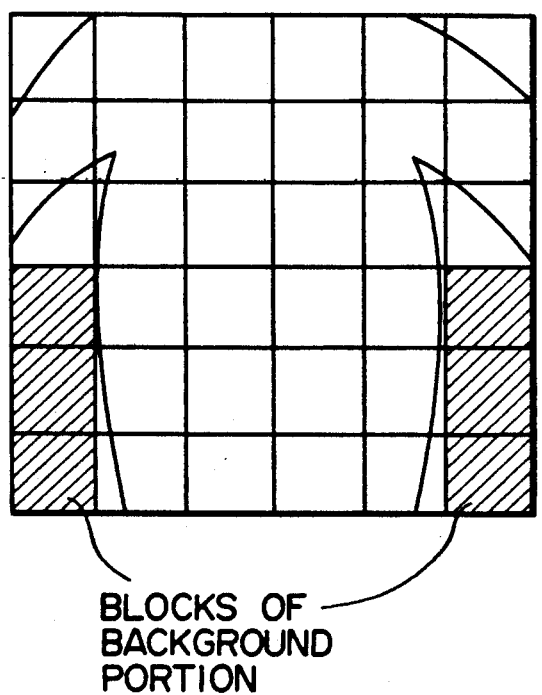
F I G. 5

IMAGE INFORMATION COMPRESSION APPARATUS

This application is a continuation, of application No. 07/140,679 filed Jan. 4,1988 now abandoned.

BACKGROUND OF THE INVENTION

The present invention relates to an image information compression apparatus for compressing medical information such as medical X-ray image data by block orthogonal transformation.

Recently, in order to save memory capacity for recording image data or to communicate data at a high speed, image data compression techniques have been developed. Known examples of data compression methods are the lossless compression method and the "lossy" compression method. In the lossless compression method, when compressed image data is decoded, a complete original image can be obtained. That is, the expansion property is good. On the contrary, in the "lossy" compression method, a complete original image cannot be obtained when compressed image data is decoded, resulting in poor reproducibility. However, the lossy compression method has a higher compression ratio than that of the lossless compression method.

Examples of "lossy" compression methods are orthogonal transformation and the predictive coding. Each of the two methods may use block coding in which the original image is divided into a plurality of blocks and compressed or a coding method in which the original image is compressed without being divided into blocks.

Generally, the orthogonal transformation and coding method with block coding has been widely adopted. More specifically, a block cosine orthogonal transformation and coding method using cosine transformations is used. This block cosine orthogonal transformation and coding method is disclosed in "Transform Coding of Images, R.J. CLARK Academic Press, 1985".

Conventionally, in order to compress image data using the block cosine transformation and coding method, an original image is first divided into a plurality of blocks, and each block is orthogonally transformed by discrete cosine transformation. A bit allocation table is formed in accordance with a transformation coefficient obtained by this orthogonal transformation. Then, the orthogonally-transformed image data is quantized in accordance with data of the bit allocation table.

When medical image data is to be compressed by the conventional data compression apparatus as described above, a bit allocation table is formed for an image, i.e., an original image. In this case, the original image includes a background portion in addition to a human body portion which is the region of interest. Therefore, if the bit allocation table is formed on the basis of image data of the original image, bit allocation for properly compressing image data of the human body portion as the region of interest cannot be performed due to the undesired background portion. As a result, a sufficient compression ratio cannot be obtained for the image data, thereby degrading the image quality.

SUMMARY OF THE INVENTION

It is, therefore, an object of the present invention to provide an image information compression apparatus having a bit allocation function capable of allocating sufficient bits to an image of a main portion as a region of interest.

According to the present invention, there is provided an image information compression apparatus comprising: discrimination circuit for discriminating a main portion, a background portion, and a mixed portion in which the main and background portions are present; orthogonal transformer for orthogonal-transforming image data except for that of the background portion, in a block unit; bit allocation table circuit for collecting transformed data of the image other than the background portion obtained by orthogonal transformation in units of frequencies, performing bit allocation in units of frequencies on the basis of collection results, and forming a bit allocation table; and quantization circuit for compressing the orthogonal-transformed original image data in accordance with the number of bits allocated by the bit allocation table.

BRIEF EXPLANATION OF THE DRAWINGS

FIG. 2 is a circuit diagram of a discrimination circuit used in the apparatus of FIG. 1;

FIG. 3 is a circuit diagram of a modification of the discrimination circuit;

FIG. 4 is a schematic view of an original image; and

FIG. 5 is a schematic view in which the original image is divided into blocks.

DETAILED EXPLANATION OF THE REFERRED EMBODIMENTS

Figure 1:
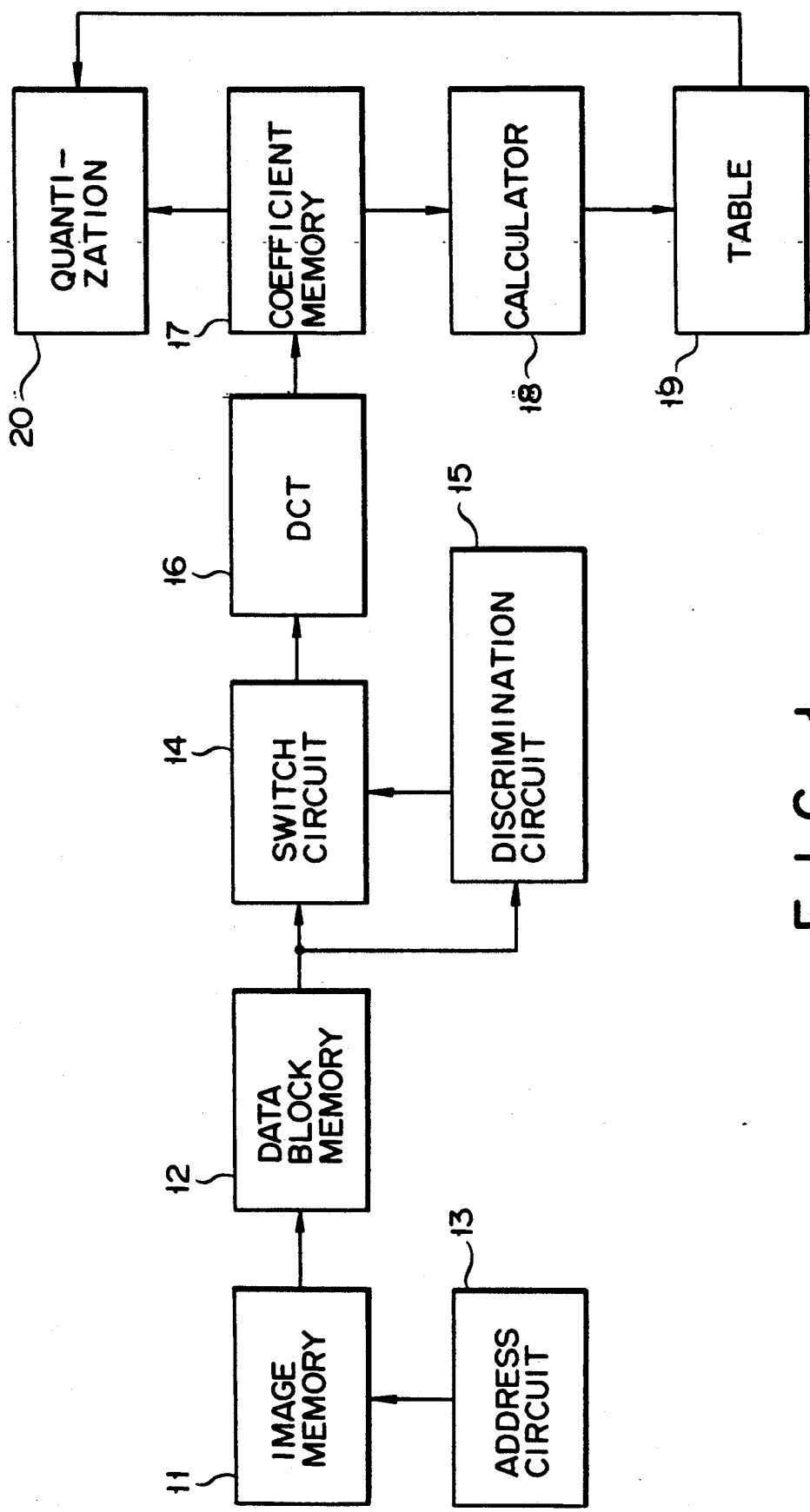
FIG. 1 is a block diagram of an image data compression apparatus according to the present invention.

As shown in FIG. 1, the readout terminal of image memory 11 for storing X-ray image data output from an image output unit such as an X-ray unit is connected to the write-in terminal of data block memory 12. Image memory 11 has a capacity of 2,048×2,048 bits, and data block memory 12 has a capacity of 16×16 bits.

The address terminal of image memory 11 is connected to the output terminal of address circuit 13. Address circuit 13 outputs address data for dividing an original image stored in image memory 11 into a plurality of blocks and reading out the blocks. The readout terminal of data block memory 12 is connected to the input terminals of switch circuit 14 and image block discrimination circuit 15. Discrimination circuit 15 discriminates a human body portion, a background portion, and a mixed portion in which the human and background portions are present. Switch circuit 14 is opened/closed in accordance with a discrimination result of discrimination circuit 15.

The output terminal of switch circuit 14 is connected to the input terminal of an orthogonal transformer such as discrete cosine transformer (DCT) 16. DCT 16 calculates discrete cosine transform coefficients in accordance with block image data. That is, DCT 16 performs processing so that a value of transform coefficient F (u,v) is concentrated on specific u and v, i.e., transforms f (x,y) into F (u,v). Note that reference symbols u and v represent spatial frequencies; and x and y, spatial position coordinates.

The output terminal of DCT 16 is connected to the write-in terminal of coefficient memory 17 for storing coefficients. The readout terminal of coefficient memory 17 is connected to the input terminal of calculator 18. The output terminal of calculator 18 is connected to the input terminal of table circuit 19. Calculator 18 collects coefficients read ou from coefficient memory 17 in units of the same coefficients. Table circuit 19 allocates bits in accordance with a collection result obtained by calculator 18 and forms a bit allocation table. Bit allocation is determined in accordance with the following equation so that a mean square error between the original image and the expanded image after compression is minimized:

$$b_{u,v} = b_{aver} + \tfrac{1}{2}\log_2 \sigma^2_{u,v} - \tfrac{1}{2}M^2 \sum_{u=0}^{M-1}\sum_{v=0}^{M-1} \log_2 \sigma^2_{u,v}$$

where $b_{u,v}$: an allocated bit length relating to a coefficient at spatial frequency (u,v)

$b_{aver}$: a size (length=width=M) of a block $\sigma^2_{u,v}$: variance of a coefficient at spatial frequency (u,v)

That is, a long bit length is allocated to a spatial frequency at which a variance is large, and a short bit length is allocated to a spatial frequency at which a variance is small.

The output terminal of table circuit 19 is connected to quantization circuit 20. Quantization circuit 20 is connected to coefficient memory 17 and quantizes coefficients read from coefficient memory 17 with bits allocated by table circuit 19.

An operation of the above image data compression apparatus will be described below.

An X-ray image as shown in FIG. 4 is stored in image memory 11. This image is constituted by human body portion A and background portion B. Background portion B is an image obtained with those X-rays radiated from an X-ray tube which are transmitted not through body portion A but through only air and detected by an X-ray detector (e.g., an image intensifier, an X-ray film, an imaging plate, and the like).

The image is divided into, for example, 6×6 blocks as shown in FIG. 5 and read out from image memory 11 in accordance with address data from address circuit 13. The readout image data of each block is stored in data block memory 12. The block image data stored in data block memory 12 is input to discrimination circuit 15. Discrimination circuit 15 discriminates whether or not the input block image data is the human body portion, the background portion, or the mixed portion. More specifically, the human body, background, and mixed portions are discriminated in accordance with density values of pixels constituting each block. Examples of a discrimination reference are as follows:

(1) An average density of pixel density values is obtained for each block, and an image block having an average value smaller than a predetermined threshold value is recognized as the background portion.

(2) A ratio of pixels having density values lower than a predetermined threshold value is obtained for each block, and a block having, more than e.g., 90% of these pixels is recognized as the background portion.

Discrimination circuit 15 shown in FIG. 2 carries out discrimination method (1). That is, densities of pixels of an image block are added by cumulative adder 22 to obtain a density average of 16×16 pixels. This density average value is compared with a set value (threshold value) by comparator 23. When the density average value is smaller than the threshold value, comparator 23 outputs a signal (of L level) which represents background portion B. When the density average value exceeds the threshold value, comparator 23 outputs a signal (of H level) which represents body portion A.

Discrimination circuit 15 shown in FIG. 3 carries out discrimination method (2). That is, according to this circuit, pixel signals of an image block and the threshold value are input to comparator 24. When a pixel signal has a density value smaller than the threshold value, comparator 24 outputs a count-up signal to counter 25. That is, counter 25 counts pixels having density values smaller than the threshold value. A count-of counter 25 is compared with a set value (90%) by comparator 23. When a ratio of pixels having density values smaller than the threshold value is 90% or more of the total number of pixels, comparator 23 outputs a discrimination signal representing the background portion.

Switch circuit 14 is opened/closed in accordance with a discrimination signal from discrimination circuit 15 shown in FIG. 2 or 3. That is, when a signal representing the background portion is input to switch circuit 14, switch circuit 14 is opened to inhibit transmission of a current image block, i.e., image data of the background portion. When a discrimination signal representing the human body portion is input to switch circuit 14, switch circuit 14 is closed to supply image data of the human body portion to DCT 16. DCT 16 discrete-cosine-transforms the input image data and outputs obtained coefficients to coefficient memory 17. That is, image data except for that of the background portion is input to DCT 16, transformed into DCT coefficients, and then stored in coefficient memory 17. Therefore, the DCT coefficients except for those of the background portion are stored in coefficient memory 17.

The DCT coefficients stored in coefficient memory 17 are collected by calculator 18 in units of the same coefficients, and table circuit 19 forms a bit allocation table in accordance with a collection result. At this time, the bit allocation table has bit allocation data except for that of the background portion.

After the bit allocation table is formed in this manner, image data is compressed in accordance with the bit allocation data. When a compression mode is set, switch circuit 14 is kept closed, so that all the image data corresponding to the background, human body, and mixed portions can be transmitted through switch circuit 14.

Image data stored in image memory 11 is divided into a plurality of blocks and read out in accordance with address data from address circuit 13 to be sequentially stored in data block memory 12. These blocks are sequentially supplied from block data memory 12 to DCT 16 through switch circuit 14. DCT 16 discrete-cosine-transforms the image data of each input block and sequentially stores its output in coefficient memory 17. Coefficient data (i.e. orthogonal transformed image data) read out from coefficient memory 17 is input to quantization circuit 20 and quantized in accordance with allocated bits of the bit allocation table. Therefore, the image data corresponding to the human body portion can be compressed with a sufficient number of bits. As a result, a sufficient compression ratio is obtained for the human body portion, thereby improving the image quality.

In the above embodiment, when an image is read out for the first time, the bit allocation table is formed, and upon the next reading, the image data is compressed in accordance with the allocated bits of the bit allocation table. That is, image compression processing is executed by two steps.

Another embodiment of the present invention will be described below.

The same portion (a chest, arms or legs, or a stomach) is photographed a plurality of times, e.g., 100 times, under the same photographing condition (simple photographing or contrast photographing), thereby forming 100 original images. Image data except for that of the background portion is orthogonally transformed for each of the 100 original images. Orthogonal transformation results of the 100 original images are stored in coefficient memory 17. Calculator 18 calculates an average value of orthogonally-transformed data read out from coefficient memory 17, and an average bit allocation table is formed on the basis of average orthogonally-transformed data. Similarly, 100 original images are formed for another portion under the same photographing condition. Then, average orthogonally-transformed data is calculated for the 100 original images, and a bit allocation table for this portion is formed in accordance with the average value.

When a preset mode for forming bit allocation tables for the respective portions is completed, an execution mode, i.e., compression processing is executed. In this execution mode, the compression processing is executed to compress a plurality of original images of a subject to be examined on the basis of the preset bit allocation tables. In this case, each original image obtained by X-ray photographing is divided into blocks, input to DCT 16 through switch circuit 14, and orthogonally transformed by DCT 16. Orthogonally-transformed data obtained from DCT 16, i.e., DCT coefficient data, is quantized in accordance with allocated bits of the preformed average bit allocation table. As a result, a plurality of original images are compressed in accordance with bit allocation data of the average bit allocation table.

As has been described above, according to the present invention, a bit allocation table is formed in accordance with image data of only a region of interest of an original image, i.e., image data of an image portion except for a background portion. Therefore, the region of interest can be compressed with sufficient bit allocation. Therefore, the compressed image of the region of interest can be decoded with good image quality.

What is claimed is:

1. An image information compression apparatus comprising:
   original image data output means for outputting original image data, including a region of interest and a region of non-interest, said region of interest having various densities;
   orthogonal transformation means for orthogonally transforming said image data provided from said output means to obtain orthogonally-transformed coefficients;
   bit allocation table means having a bit allocation table for determining bit assignments for the receptive orthogonally transformed coefficients;
   table generating means for producing said bit allocation table, said table generating means including:
   dividing means for dividing the original image data into a plurality of image data blocks,
   discriminating means for excluding said image data blocks containing the region of non-interest and passing said image data blocks containing the region of interest, and
   bit allocation transforming means for forming said bit allocation table from orthogonally-transformed coefficients which are produced from said orthogonal transformation means, in accordance with the image data blocks from said discriminating means so that said bit assignments for he respective oroghtogonally-transformed coefficients are adapted from only the image data containing the region of interest; and
   quantizing means for quantizing said orthogonally-transformed coefficients for said image data blocks containing both the region of non-interest and the region of interest provided from said orthogonal transformation means in accordance with said bit allocation table means; and
   switching means for deactivating said discriminating means when said quantizing means is activated.

2. An apparatus according to claim 1, wherein said discriminating means comprises calculating means for calculating an average value of image densities for each of the image data blocks, comparing means for comparing the average value obtained by said calculating means with a predetermined value and outputting a discrimination signal, and image data block output means of outputting image data blocks corresponding to the region of interest to said orthogonal transformation means in response to the discrimination signal.

3. An apparatus according to claim 1, wherein said discriminating means comprises comparing/counting means for comparing each of the densities of a plurality of pixels constituting each of the image data blocks with a predetermined density value and counting pixels having densities below the predetermined density value, comparing mean for comparing a count obtained by said comparing/counting means with a predetermined value, and outputting a discrimination signal, and image data block output means for outputting image data blocks corresponding to the region of interest to said orthogonal transformation means in response to the discrimination signal.

4. An apparatus according to claim 1, wherein said orthogonal transformation means comprises a discrete cosine transformer for calculating discrete cosine transform coefficients in accordance with the image data blocks.

5. An apparatus according to claim 11, wherein said bit allocation transforming means comprises collecting means for collecting the orthogonally-transformed coefficients obtained from said orthogonal transformation means in units of frequency components, and bit allocation executing means for executing bit allocation with respect to the orthogonally-transformed coefficients in accordance with a result obtained by said collecting means.

6. An apparatus according to claim 5, wherein said orthogonal transformation means comprises means for discrete-cosine-transforming said image data and outputting discrete-cosine-transformed coefficients corresponding to the orthogonally-transformed coefficients.

7. An apparatus according to claim 1, wherein said bit allocation transforming means comprises calculating means for calculating an average value of the orthogonally-transformed coefficients corresponding to image data obtained by removing the region of non-interest from a plurality of original images, and bit allocation executing means for executing bit allocation in accordance with the average value of the orthogonally-transformed coefficients.

8. An apparatus according to claim 7, wherein said orthogonal transformation means comprises means for discrete-cosine-transforming said image data and outputting discrete-cosine-transformed coefficients corresponding to the orthogonally-transformed coefficients.

9. An apparatus according to claim 1, wherein said original image data output means comprises image memory means for storing image data including a background portion corresponding to the region of non-interest and a human body portion corresponding to the region of interest, and said dividing means comprises address data output means for outputting address data corresponding to the image data blocks to said image memory means so as to sequentially read out the image data blocks from said image memory means.

10. An apparatus according to claim 9, wherein said dividing means has block data memory means for storing the image data blocks read out from said image memory means.

11. An apparatus according to claim 1, wherein said original image data output means includes X-ray image output means for outputting an X-ray image having corresponding to the regions of non-interest and interest.

* * * * *

UNITED STATES PATENT AND TRADEMARK OFFICE
CERTIFICATE OF CORRECTION

PATENT NO. : 5,014,198
DATED : May 7, 1991
INVENTOR(S) : Yoshiyuki Umemura

It is certified that error appears in the above-identified patent and that said Letters Patent is hereby corrected as shown below:

Claim 1, column 6, line 5, change "he" to --the--.

Claim 1, column 6, line 5, change "oroghtogonally-transformed" to --orthogonally-transformed--.

Claim 1, column 6, line 6, change "from" to --for--.

Claim 3, column 6, line 32, change "mean" to --means--.

Claim 5, column 6, line 44, change "claim 11" to --claim 1--.

Claim 11, column 8, line 10, before "corresponding" insert --background and human body portions respectively--.

Signed and Sealed this

Thirteenth Day of April, 1993

*Attest:*

STEPHEN G. KUNIN

*Attesting Officer*   *Acting Commissioner of Patents and Trademarks*